Dec. 30, 1924.
F. STEVENS
1,521,483
PREPARED GASKET AND PROCESS OF MAKING SAME
Filed Aug. 19, 1922
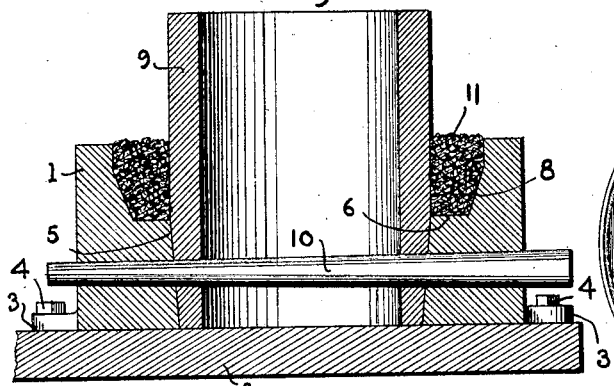
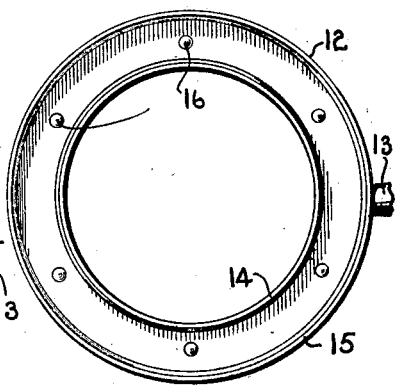
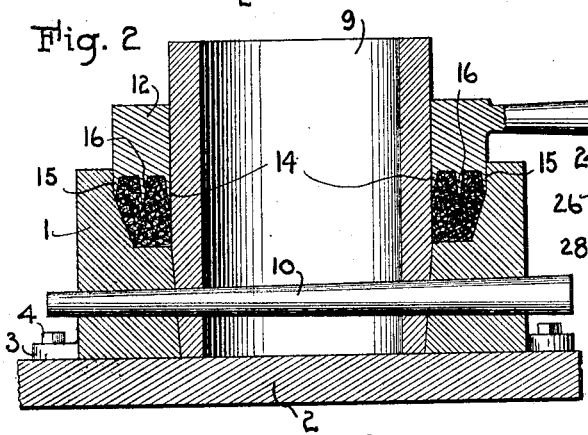
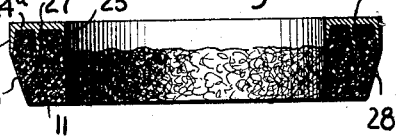
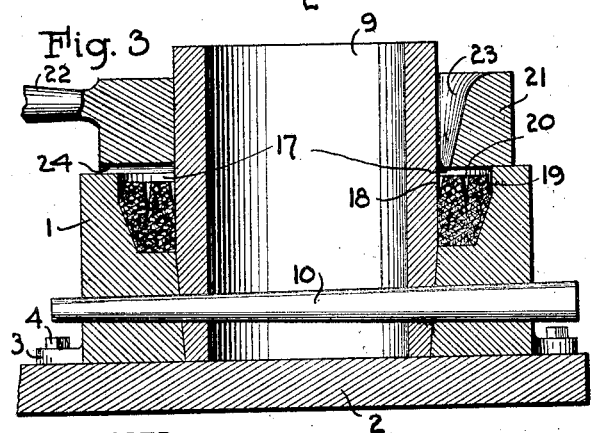
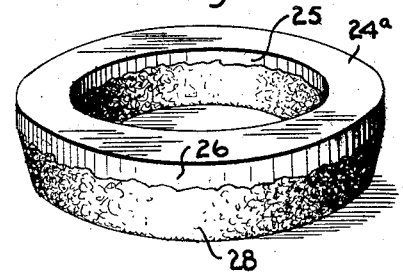
WITNESSES
Fred Stevens,
INVENTOR,
BY
ATTORNEY Patented Dec. 30, 1924.

1,521,483

UNITED STATES PATENT OFFICE.

FRED STEVENS, OF BIRMINGHAM, ALABAMA, ASSIGNOR TO AMERICAN CAST IRON PIPE COMPANY, OF BIRMINGHAM, ALABAMA, A CORPORATION OF GEORGIA.

PREPARED GASKET AND PROCESS OF MAKING SAME.

Application filed August 19, 1922. Serial No. 583,052.

*To all whom it may concern:*

Be it known that I, FRED STEVENS (and that "FRED" is my full Christian name), a citizen of the United States, residing at Birmingham, in the county of Jefferson and State of Alabama, have invented new and useful Prepared Gaskets and Processes of Making Same, of which the following is a specification.

This invention relates to gaskets, and more particularly to prepared gaskets for use in connection with pipe joints, stuffing boxes or the like.

The object is to provide a gasket formed of a continuous ring of fibrous material of any desired diameter and shaped, in transverse section, to fit the seat in which it is to be used, said fibrous material being calked or pressed in the forming mold so as to retain such shape, and being supplied with a soft lead or other metal annulus on one face of the fibrous ring, and held thereto by the fibers becoming anchored in the lead, which is applied thereto in molten condition, said lead ring serving to maintain the shape of the fibrous packing ring and acting as a calking surface when applying the gasket in a pipe joint, or as a bearing ring for the gland when the gasket is used in a stuffing box.

Another object is to provide such a gasket comprising an annular ring formed of compressed fibrous material and carrying a malleable metal annulus on one face thereof, the latter being adapted to remain with the packing ring to retain its shape and to receive the pressure within the pipe joint or stuffing box, said gasket being especially designed for use in connection with the pipe joint shown and described in Patent No. 1,365,530, issued to William D. Moore, Jany. 11, 1921, and particularly the form of joint shown therein having the two coacting flanges formed integrally with the pipe sections.

In addition to the gasket per se, the invention contemplates the method of forming and producing the same and the various steps employed in said process.

A full and complete understanding of the invention may be obtained from a consideration of the following detailed description, taken in connection with the accompanying drawing forming a part of this specification; it being understood that while the drawing shows a practical form of invention and practical steps in producing the same, the invention is not confined to strict conformity with the showing thereof, but, may be changed or modified, so long as such changes or modifications mark no material departure from the salient features of the invention as specifically pointed out in the appended claims.

In the drawing, in which similar reference characters designate corresponding parts throughout the several figures:

Figs. 1, 2 and 3 are similar vertical sectional views illustrating the first, second and third steps, respectively, in the manufacture of the improved gasket·

Fig. 4 is a plan view of the inner side of the malleable retaining or calking ring, or annulus;

Fig. 5 is a transverse sectional view of the finished gasket having the annulus applied thereto;

Fig. 6 is a perspective view of the improved gasket with the annulus attached thereto.

In the aforesaid patent, the particular form of pipe joint referred to and with which the present invention is specially designed for use, the two abutting ends of adjacent pipe sections are equipped respectively with bell and spigot ends, the latter fitting into the former in the usual manner, and having outstanding, integral flanges provided with alined openings for tie bolts, which are adapted to draw an impinging flange formed on the spigot end, into a resilient packing element, for the purpose of making a tight joint. It has been found desirable to supply ready formed gaskets for use in connection with such joint, such gaskets being formed at the factory in the various sizes to fit the particular pipe in which they are to be used, and shipped along with the pipe, either in position in the socket of the bell, or packed separately to be later applied in position therein. To do this safely without the danger of marring or deforming the gaskets, they are provided with the metallic reinforcing or retaining annulus or ring, preferably formed of some malleable metal, such as lead, and so made as to be interlocked with the fibres of the packing ring and thus preserve their shape and form a penetrable surface for the action of the aforesaid impinging flange.

In producing the gasket, a mold 1 is used having means for holding and shaping the exterior walls of fibrous ring when the latter is subjected to pressure. This mold consists of a metallic ring comprising a base member adapted to be supported on a bench 2, or other support, said ring having outstanding lugs 3 at its lower edge, and provided with apertures for the reception of bolts 4 for securing the mold 1 to the support.

The mold is provided with a central bore or passageway 5, whose walls converge toward the bottom of the mold, and connect at their upper ends with an annular shoulder 6 provided in the mold and forming the bottom of an annular cavity or receptacle, the outer circumferential wall 7 of which connects, at its lower end, with a downwardly and inwardly tapering wall 8.

A tubular mandrel 9 having its lower end exteriorly tapered to fit the central bore or passageway 5 of the mold, is fitted therein and forms the inner wall of the said cavity or receptacle, the said mandrel and the base member or mold having alined, horizontally disposed openings between the annular shoulder 6 and the bottom of the mold, said alined openings being tapered generally, for the reception of a tapered locking bar or pin 10 which may be driven through the openings to extend from either side of the mold to securely and rigidly hold the mandrel in place, the tapering lower end of the same forming a tight joint in the mold or base.

With the mandrel locked in position by the pin 10, a suitable quantity of fibrous packing 11, such as jute, hemp, flax, oakum, or other similar material, is then placed or stuffed in the cavity of the mold around the mandrel, and the same may thus be more or less compacted with the fibrous material extending slightly above the surface of the mold, all of which is clearly illustrated in Fig. 1 of the drawing.

After the packing is thus positioned, a forming ring 12, having an internal diameter to fit the mandrel, is then placed over the latter and forced down onto the packing, the external diameter of the ring being such as to easily enter the mouth of the cavity or receptacle for the packing but to fit the same closely enough to prevent any of the packing from squeezing out around said ring.

The forming ring 12 is provided with an outstanding handle 13, connected to the outer wall thereof, and has an inner and an outer depending flange 14 and 15 respectively, whose outer faces are flush with the inner and outer walls of the forming ring, and whose inner faces are tapered to provide knife edges on said flanges, which thus fit freely into the upper, open end of the cavity together with the lower portion of said ring, and provide inner and outer channels in the upper portion of the packing when the forming ring is forced downwardly into the same, as by hammering or otherwise forcing, to compress the fibrous material. The forming ring is also provided with a plurality of downwardly projecting pins 16 formed integrally or otherwise secured to the under side of the ring, and spaced equally around and centrally between the inner and outer flanges 14 and 15, as clearly shown in Figure 4. These pins enter the fibrous material, together with the flanges 14 and 15, when the forming ring is forced down, as will be seen by reference to Figure 2. The pins and the flanges are of substantially the same length. The flanges are tapered to a thin edge and the pins are tapered to a point as shown.

After thus forming the packing material, the ring 12 is removed from around the mandrel and the compressed packing material is left somewhat below the surface of the mold to provide a channel 17 and with an inner and outer channel 18 and 19, and a series of depressions 20 in its upper face formed by the flanges and pins of the ring 12, as shown in Figure 3 and these depressions and channels remain in the packing after the said ring is removed.

A casting ring 21 is then placed over the mandrel by means of a handle 22, and the said ring rests upon the upper surface of the base member or mold 1, the diameter of said ring being somewhat greater than the diameter of the outer wall 19 of the cavity or receptacle, so that the bottom wall of the casting ring completely covers the cavity and forms a top wall to the channel 17. The casting ring has, at one point, a tapered opening 23 communicating with the bore thereof, so that the mandrel forms one wall of said opening and provides a gate, whose lower reduced end communicates with the annular channel 17 at the top of the packing, and whose upper end is flared outwardly to facilitate the pouring of metal therethrough. At a diametrically opposite point from the gate, the casting ring is provided with a vent opening 24, formed in its lower face and also communicating with the annular channel 17, so as to provide an outlet for the air and gases produced when the said metal is poured, which will be seen by reference to Figure 3.

When the lead or other malleable metal is poured, the channel 17 is filled to form the annulus $24^a$, as shown in Figures 5 and 6 and the integral inner and outer flanges 25 and 26 respectively, as also the pins 27 are likewise formed, the said flanges 18 and 19, when the metal cools, shrinking and hugging the material of the packing so as to firmly retain the annulus $24^a$ on the gasket, the pins 27 entering the central portion of the gasket further serving to hold the metal ring in place. The inner face of the annulus which bears against the packing is made flat between the flanges and the pins. Both the pins and the flanges are tapered and are of substantially the same length.

After removing the casting ring 21 from around the upper end of the mandrel and driving out the locking pin 10, the said mandrel may then be removed from within the mold 1 to expose the inner surface of the completed gasket, and the latter may be taken out of the cavity in the mold and the fins and other projections cut from the same, when the gasket is finished and ready to be inserted in the prepared joint of the pipe at the factory or foundry, or to be packed and shipped to the point of use in quantities to be later placed in position in the bell end of the pipe.

From the foregoing it will be seen that a simple, cheaply manufactured article has been provided for use as packing in a pipe joint or in stuffing boxes, and that the metal ring formed on and carried by the gasket provides a retaining means for preserving the shape or contour of the same, and also provides means for receiving the pressure of the gland and imparting the pressure uniformly to the fibrous packing material.

What is claimed is:

1. The process of forming prepared gaskets for pipe joints or the like, which consists in compressing fibrous packing material into the desired shape and simultaneously providing seats in the packing material while the latter is held in shape, then pouring molten malleable metal on the packing material to form a facing thereon, said metal filling the seats and compressing the packing material by shrinkage when cooling to hold the said facing to the gasket.

2. The process of forming prepared gaskets for pipe joints, stuffing boxes or for similar use, which consists in compressing fibrous, packing material into a mold to form a ring of the desired shape in cross section, and simultaneously forming grooves or channels in the top or gland-bearing face of the packing ring while the same is held in the mold, then pouring molten lead or similar metal on said face of the packing ring, said metal filling the grooves or channels to hold the metal in place and forming a retaining ring for the packing, when cooled, and to receive the compressing force of a gland while in use.

3. The process of forming prepared gaskets for pipe joints, stuffing boxes or for similar use, which consists in compressing fibrous, packing material into a mold to form a ring of the desired shape in cross section and simultaneously forming tapered, circumferential seats or channels around the inner and outer edges of the upper or exposed face of the fibrous material in the mold and a series of centrally-disposed depressions between said channels, then pouring lead on said face to form an annulus thereon and to fill the depressions and marginal channels and form integral flanges in the latter which, when cooled, shrink and hold the annulus to the packing.

4. The process of forming prepared gaskets which consists in stuffing fibrous packing material into the annular channel of a mold provided with a removable mandrel, then placing a forming ring over the mandrel and onto the fibrous material in the mold and forcing the same downwardly, below the surface of the mold to compact the material and to form an inner annular groove or channel next to the mandrel, an outer annular groove or channel next to the wall of the mold, and a circular series of depressions between the same, then removing the forming ring from the mandrel and replacing the same with a casting ring having a gate, then pouring molten metal through the gate to fill the space between the top of the fibrous ring and the mold and to fill the channels and depressions to form a malleable metal facing ring on the gasket and to hold the same thereto to retain the shape of the gasket, then removing the mandrel and then the gasket together with the facing and retaining ring from the mold, and then trimming off all fins and projections.

5. A prepared gasket for use in pipe joints, stuffing boxes and similar places, comprising a ring formed of fibrous material substantially wedge-shaped in cross section, and an annular facing of malleable metal interlocked with the fibrous material on the broad face of the ring and having inner and outer integral annular flanges tapered toward their free ends and flush with the inner and circumferential faces of said ring and embracing the latter, said metallic facing on the side contacting with the fibrous material being made flat between the flanges.

6. A prepared gasket for use in pipe joints, stuffing boxes and similar places, comprising a ring formed of fibrous material of the desired cross-sectional shape, and an annular facing of malleable metal interlocked with the fibrous material on one face of the ring and having inner and outer integral annular flanges flush with the inner and circumferential faces of said ring and embracing the latter and provided with a series of integral pins extending from the inner side of the facing and spaced around and between the flanges and entering the fibrous ring to retain the annular facing on the ring.

7. A prepared gasket for use in pipe joints, stuffing boxes and similar places, comprising a ring formed of fibrous material of the desired cross sectional shape, and a facing of metal interlocked with the fibrous material on one face of the ring, and consisting of an annulus with inner and outer integral annular flanges flush with the inner and circumferential faces of said ring and embracing the latter, and a series of integral pins spaced around and between the flanges and entering the fibrous material and embedded therein, said flanges being tapered to a thin edge and the pins to a point, and the facing between the flanges and the pins being flat.

8. A prepared gasket for use in pipe joints, stuffing boxes and similar places, comprising a ring formed of fibrous material of the desired cross sectional shape, and a facing of metal interlocked with the fibrous material on one face of the ring, and consisting of an annulus with inner and outer integral annular flanges flush with the inner and circumferential faces of said ring and embracing the latter, and a series of integral pins spaced around and between the flanges and entering the fibrous material and embedded therein, said flanges being tapered to a thin edge and the pins to a point, and the facing between the flanges and the pins being flat, the flanges and the pins being of substantially the same length.

In testimony that I claim the foregoing as my own I have hereto affixed my signature.

FRED STEVENS.